(12) United States Patent
Dupre et al.

(10) Patent No.: US 12,124,263 B2
(45) Date of Patent: *Oct. 22, 2024

(54) GENERATING TRAJECTORIES FOR AUTONOMOUS VEHICLES

(71) Applicant: Waymo LLC, Mountain View, CA (US)

(72) Inventors: Guillaume Dupre, San Francisco, CA (US); Benjamin Charrow, Millbrae, CA (US)

(73) Assignee: Waymo LLC, Mountain View, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 17/573,048

(22) Filed: Jan. 11, 2022

(65) Prior Publication Data
US 2022/0187834 A1 Jun. 16, 2022

Related U.S. Application Data

(63) Continuation of application No. 16/152,627, filed on Oct. 5, 2018, now Pat. No. 11,256,260.

(51) Int. Cl.
*G05D 1/00* (2024.01)
*B60W 50/00* (2006.01)
*G01C 21/34* (2006.01)

(52) U.S. Cl.
CPC ....... *G05D 1/0214* (2013.01); *B60W 50/0098* (2013.01); *G01C 21/3461* (2013.01); *G05D 1/0088* (2013.01); *B60W 2050/0052* (2013.01)

(58) Field of Classification Search
CPC .............. G05D 1/0214; G05D 1/0212; B60W 50/0098; B60W 2050/0052; G01C 21/3461

See application file for complete search history.

(56) References Cited

U.S. PATENT DOCUMENTS 9,248,834 B1 2/2016 Ferguson et al.
9,645,577 B1 5/2017 Frazzoli et al.
(Continued)

OTHER PUBLICATIONS

2016 Tesla Model S Manual (Year: 2016).
(Continued)

*Primary Examiner* — Mahmoud S Ismail
*Assistant Examiner* — Gabriel Anfinrud
(74) *Attorney, Agent, or Firm* — Botos Churchill IP Law

(57) ABSTRACT

Aspects of the disclosure provide for generation of trajectories for a vehicle driving in an autonomous driving mode. In one instance, a default number of trajectories to be generated may be identified. A set of maneuvering options may be selected from a set of predetermined maneuvering options based on the number of trajectories. The set of maneuvering options may be filtered based on the default number of trajectories. A set of trajectories may be generated based on the filtered set of maneuvering option such that each trajectory of the set corresponds to a different maneuvering behavior. A cost for each trajectory of the set of trajectories may be determined, and one of the trajectories of the set of trajectories may be selected based on the determined costs. The vehicle may be maneuvered in the autonomous driving mode according to the selected one of the trajectories.

21 Claims, 12 Drawing Sheets

(56) References Cited

U.S. PATENT DOCUMENTS

| | | | |
|---|---|---|---|
| 9,857,184 B2 | 1/2018 | Kaehler et al. | |
| 9,857,795 B2 | 1/2018 | Gupta et al. | |
| 9,910,441 B2 | 3/2018 | Levinson et al. | |
| 2013/0211656 A1 | 8/2013 | An | |
| 2016/0091897 A1 | 3/2016 | Nilsson et al. | |
| 2016/0200317 A1* | 7/2016 | Danzl | B60W 10/04 701/25 |
| 2017/0277195 A1* | 9/2017 | Frazzoli | B60W 30/0956 |
| 2018/0141544 A1 | 5/2018 | Xiao et al. | |
| 2018/0170395 A1* | 6/2018 | Luo | G05D 1/0088 |
| 2018/0281191 A1* | 10/2018 | Sinyavskiy | A47L 11/4061 |
| 2018/0284785 A1* | 10/2018 | Berntorp | G08G 1/166 |
| 2019/0367021 A1* | 12/2019 | Zhao | B60W 60/0011 |

OTHER PUBLICATIONS

Meyer, Ulrich [2002], Buckets strike back: Improved parallel shortest-paths, Proceedings of the 16th International Parallel and Distributed Processing Symposium, IEEE Computer Society, Fort Lauderdale, Florida, United States (Year: 2002).

* cited by examiner

GENERATING TRAJECTORIES FOR AUTONOMOUS VEHICLES

CROSS REFERENCE TO RELATED APPLICATIONS

The present application is a continuation of U.S. patent application Ser. No. 16/152,627, filed Oct. 5, 2018, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a pickup or destination location, and the vehicle maneuvers itself to that location by controlling various systems of the vehicles, including acceleration and deceleration systems of the vehicle. Typically, control of such vehicles involves generations of trajectories which define locations, accelerations or decelerations, speeds, etc. for a vehicle for some period of time into the future. These trajectories are often generated by preselecting how the vehicle should respond to a situation (such as make a right turn or merge) and/or then generating a large and sometimes random number of trajectories in a predetermined period of time. Thereafter, a trajectory may be selected by analyzing costs of the generated trajectories. However, these approaches may be both inefficient and costly ways to generate trajectories.

BRIEF SUMMARY

One aspect of the disclosure provides a method of generating trajectories for a vehicle driving in an autonomous driving mode. The method includes selecting, by the one or more processors, a set of maneuvering options from a set of predetermined maneuvering options, each predetermined maneuvering option defining a different maneuvering behavior for the vehicle; generating, by the one or more processors, a set of trajectories based on the set of maneuvering options such that each trajectory of the set corresponds to a different maneuvering behavior for the vehicle; determining, by the one or more processors, a cost for each trajectory of the set of trajectories; selecting, by the one or more processors, one of the trajectories of the set of trajectories based on the determined costs; and maneuvering, by the one or more processors, the vehicle in the autonomous driving mode according to the selected one of the trajectories and the corresponding different maneuvering behavior for the selected one of the trajectories.

In one example, the method also includes identifying a default number of trajectories, and prior to generating the set of trajectories, filtering, by the one or more processors, the set of maneuvering options based on the default number of trajectories. In this example, generating the set of trajectories is based on the filtered set of trajectories. In another example, each predetermined maneuvering options is associated with a priority level, and wherein the filtering is further based on the priority levels of the set of maneuvering options. In another example, the filtering includes reducing a number of maneuvering options of the set of maneuvering options to equal the number of trajectories. In another example, the set of maneuvering options is not filtered when a number of maneuvering options of the set of maneuvering options is less than the number of trajectories. In another example, the set of maneuvering options is determined based on a maneuvering option for a prior selected trajectory. In this example, the set of maneuvering options is determined based on an alternative maneuvering option for the prior selected trajectory. In another example, the set of maneuvering options is determined based on contextual information objects perceived by a perception system of the vehicle as well as predicted behaviors for those objects. In another example, the set of maneuvering options is determined based on a type of situation in which the vehicle is currently. In another example, the set of trajectories are computed in parallel. In another example, the method also includes generating a set of constraints based on objects perceived by a perception system of the vehicle, and computing the set of trajectories includes attempting to solve for all of the set of constraints. In another example, determining the cost for each trajectory is further based on a likelihood of a collision between the vehicle and another object. In another example, the selected one of the trajectories is selected for having a lowest of the determined costs. In another example, the selected one of the trajectories effectively allows the vehicle to cancel a prior maneuvering behavior of a prior trajectory. In this example, the prior maneuvering behavior is a lane change, and the corresponding different maneuvering behavior for the selected one of the trajectories is not a lane change. Alternatively, the prior maneuvering behavior is a right or left turn, and the corresponding different maneuvering behavior for the selected one of the trajectories is not a right or left turn. In another example, the selected one of the trajectories effectively allows the vehicle to cancel a prior maneuvering behavior in favor of the corresponding different maneuvering behavior for the selected one of the trajectories. In this example, the corresponding different maneuvering behavior for the selected one of the trajectories is changing lanes. In addition or alternatively, the corresponding different maneuvering behavior for the selected one of the trajectories is a right or left turn. In addition or alternatively, the corresponding different maneuvering behavior for the selected one of the trajectories is passing another vehicle.

DETAILED DESCRIPTION

Overview

Figure 1:
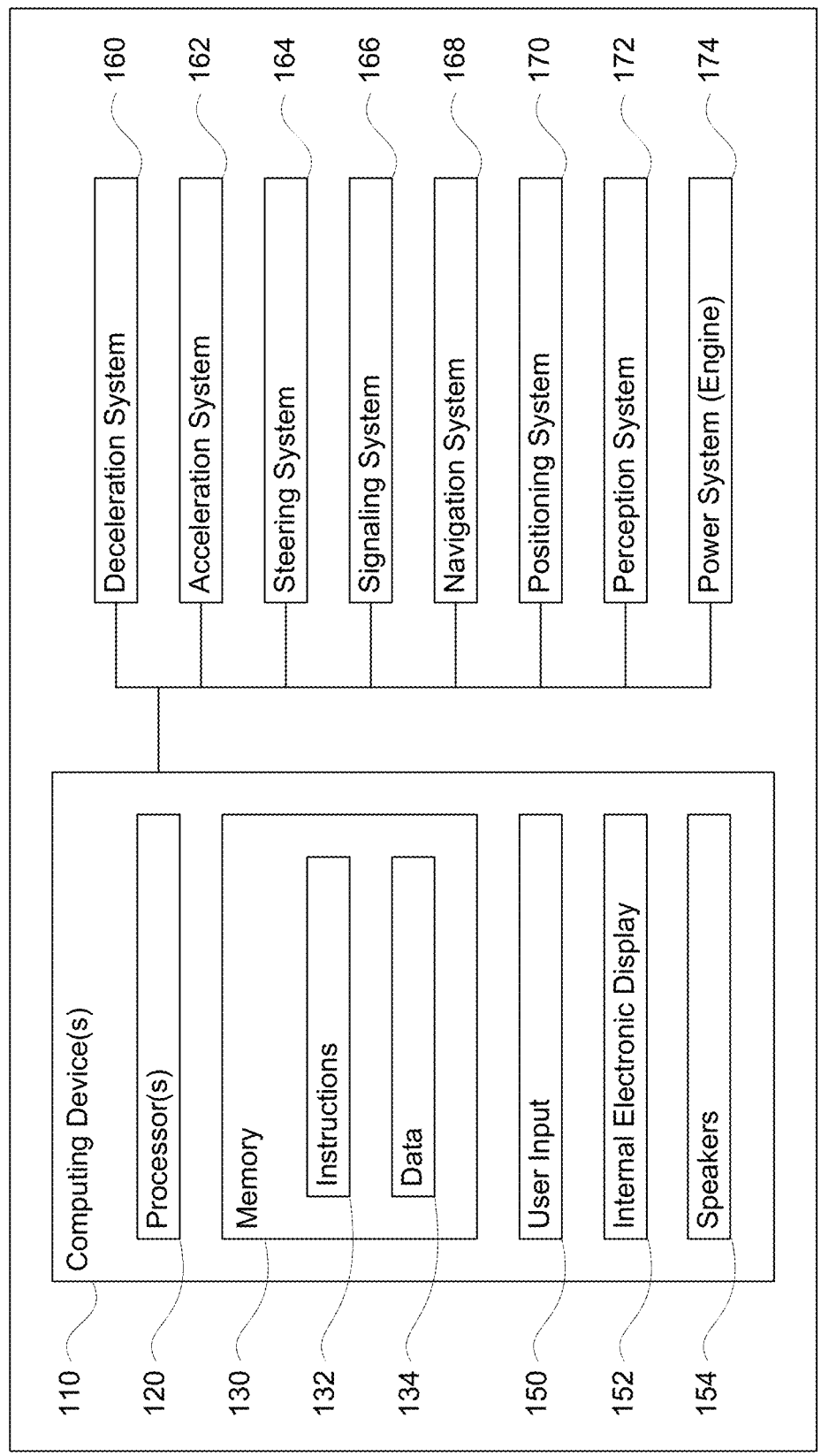
FIG. 1 is a functional diagram of an example vehicle in accordance with aspects of the disclosure.

The technology relates to generating trajectories for vehicles driving in an autonomous driving mode which allow the vehicle to effectively change its prior intended behavior as the world around the vehicle changes. This may allow the vehicle to cancel maneuvers or maneuvering behaviors and execute different maneuvers or maneuvering behaviors. In order to do so, the vehicle's computing devices may generate alternative trajectories for different maneuvering behaviors and select the trajectory, and consequently the maneuvering behavior, with the lowest cost to avoid a collision and/or to minimize uncomfortable driving maneuvers, such as hard brakes and swerves.

Because the number of possible routes and decisions for a vehicle to make in any given situation may be infinite, the vehicle's computing devices may first identify or determine a number of trajectories to be generated. This may be based on a default or fixed number of trajectories.

Once the number of trajectories is determined, the vehicle's computing devices may then select a set of maneuvering options from a set of predetermined maneuvering options. A maneuvering option may be a predefined maneuvering behavior for the vehicle such that all maneuvering options are predefined. Maneuvering options may also be prioritized. At least some of the maneuvering options may be associated with alternative maneuvering options. Maneuvering options may be selected based on a type of maneuvering option selected for a prior iteration, specific alternatives to that type of trajectory, as well as contextual information.

In some instances, the set of maneuvering options may have more maneuvering behaviors than the number of trajectories to be generated. As such, the set of maneuvering options may be filtered to reduce the number of maneuvering options in the set of maneuvering options to equal the number of trajectories to be generated.

Thereafter, a corresponding trajectory may be generated for each maneuvering option of the set of maneuvering options. The trajectories may be generated, for instance, based on a set of constraints. Thus, for each given maneuvering option of the set of maneuvering options computing devices may then generate a trajectory that allows the vehicle to satisfy as many constraints as the set of constraints as in order to follow the given maneuvering option.

The vehicle's computing devices may then determine a cost for each trajectory. The vehicle's computing devices may then select the trajectory having the lowest cost value. This trajectory may then be used to control the vehicle until a new trajectory is generated, for instance in a next iteration. In that regard, the process would return to determining a number of trajectories, selecting a set of maneuvering options, filtering the set of maneuvering options (if needed), generating trajectories, determining the costs for the trajectories, and selecting a lowest cost trajectory.

The features described herein may allow the vehicle's computing devices to generate trajectories in an efficient and useful way. For instance, rather than simply generating a random number of trajectories in a predetermined period of time, a fixed number of trajectories with specific maneuvering behaviors selected based on current circumstances may be generated. This increases efficiency and usefulness of the trajectory generation, and in effect, the vehicle is able to cancel maneuvers and execute different maneuvers which may result in an increase in the adaptiveness of the vehicle. In other words, the vehicle is able to give up on its current behavior and choose to go somewhere else in order to avoid a collision or other unwanted circumstance. This, in turn, may improve the quality of the ride and the safety of the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be control computing devices of an autonomous driving computing system or incorporated into vehicle 100. The autonomous driving computing system may capable of communicating with various components of the vehicle in order to control the movement of vehicle 100 according to the autonomous control software of memory 130 as discussed further below. For example, returning to FIG. 1, computing devices 110 may be in communication with various systems of vehicle 100, such as deceleration system 160 (for instance, including the features connected or otherwise attached to the brake pedal of the vehicle), acceleration system 162 (for instance, including the features connected or otherwise attached to the accelerator pedal of the vehicle), steering system 164, signaling system 166, navigation system 168, positioning system 170, perception system 172, and power system 174 (i.e. the vehicle's engine or motor) in order to control the movement, speed, etc. of vehicle 100 in accordance with the instructions 132 of memory 130. For instance, the computing devices 110 may generate trajectories for the vehicle 100 to follow and control the vehicle according to the trajectory by sending commands to the deceleration system 160 (to control braking power and accordingly, deceleration) as well as acceleration system 162 (to control acceleration and changes in acceleration). Again, although these systems are shown as external to computing devices 110, in actuality, these systems may also be incorporated into computing devices 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

Figure 2:
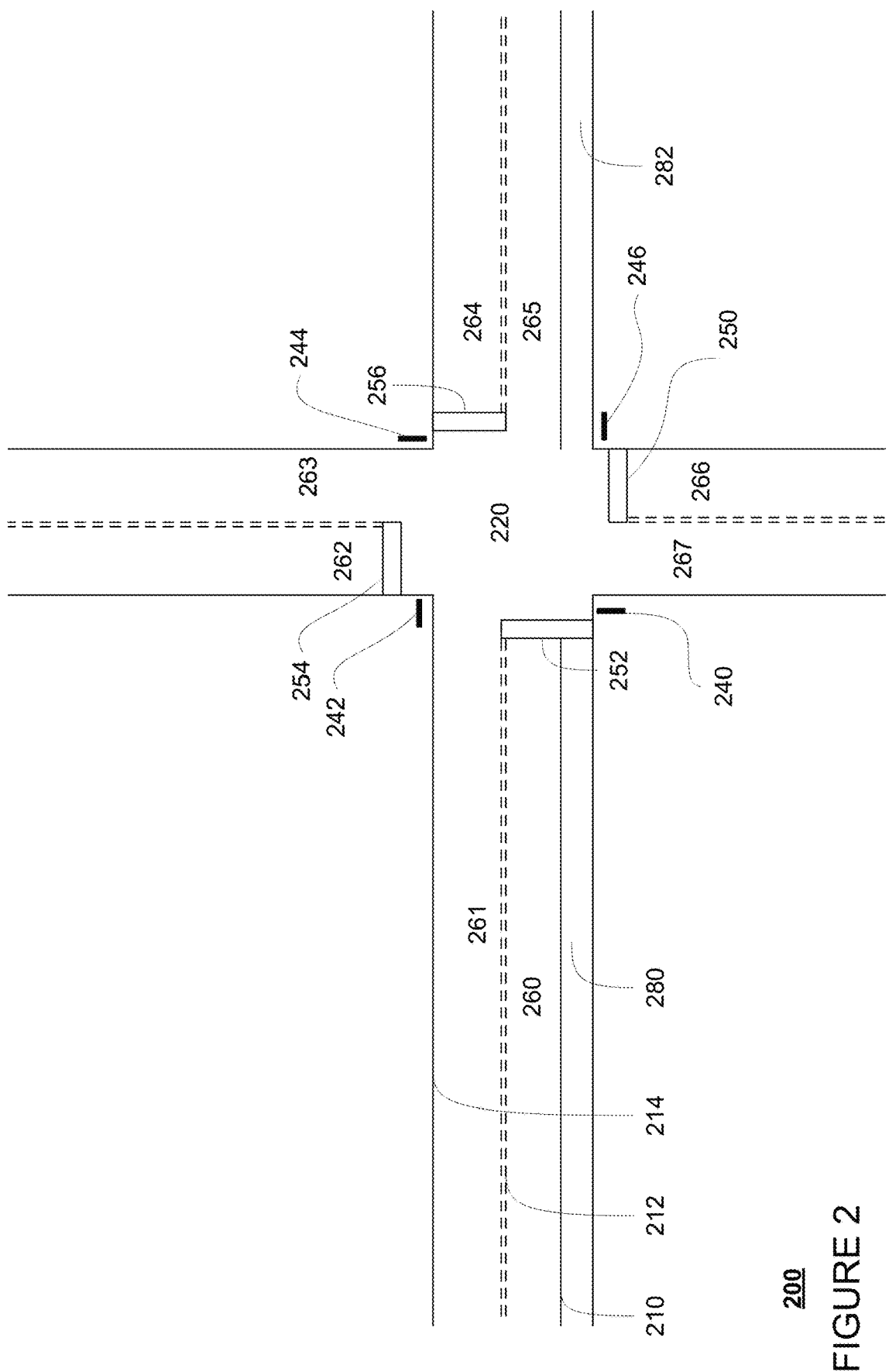
FIG. 2 is an example representation of map information in accordance with aspects of the disclosure.

FIG. 2 is an example of map information 200 for a section of roadway including intersection 220. In this example, map information 200 depicts a portion of the map information that includes information identifying the shape, location, and other characteristics of lane markers or lane lines 210, 212, 214, stop signs 240, 242, 244, 246, as well as stop lines 250, 252, 254, 256. The lane lines may also define various lanes 260, 261, 264, 265, implied by the width of a road, such as lanes 262, 263, 266, 267, and/or lanes 260-267 may also be explicitly identified in the map information 200. In this example, map information 200 also identifies bicycle lanes 280, 282. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 3:
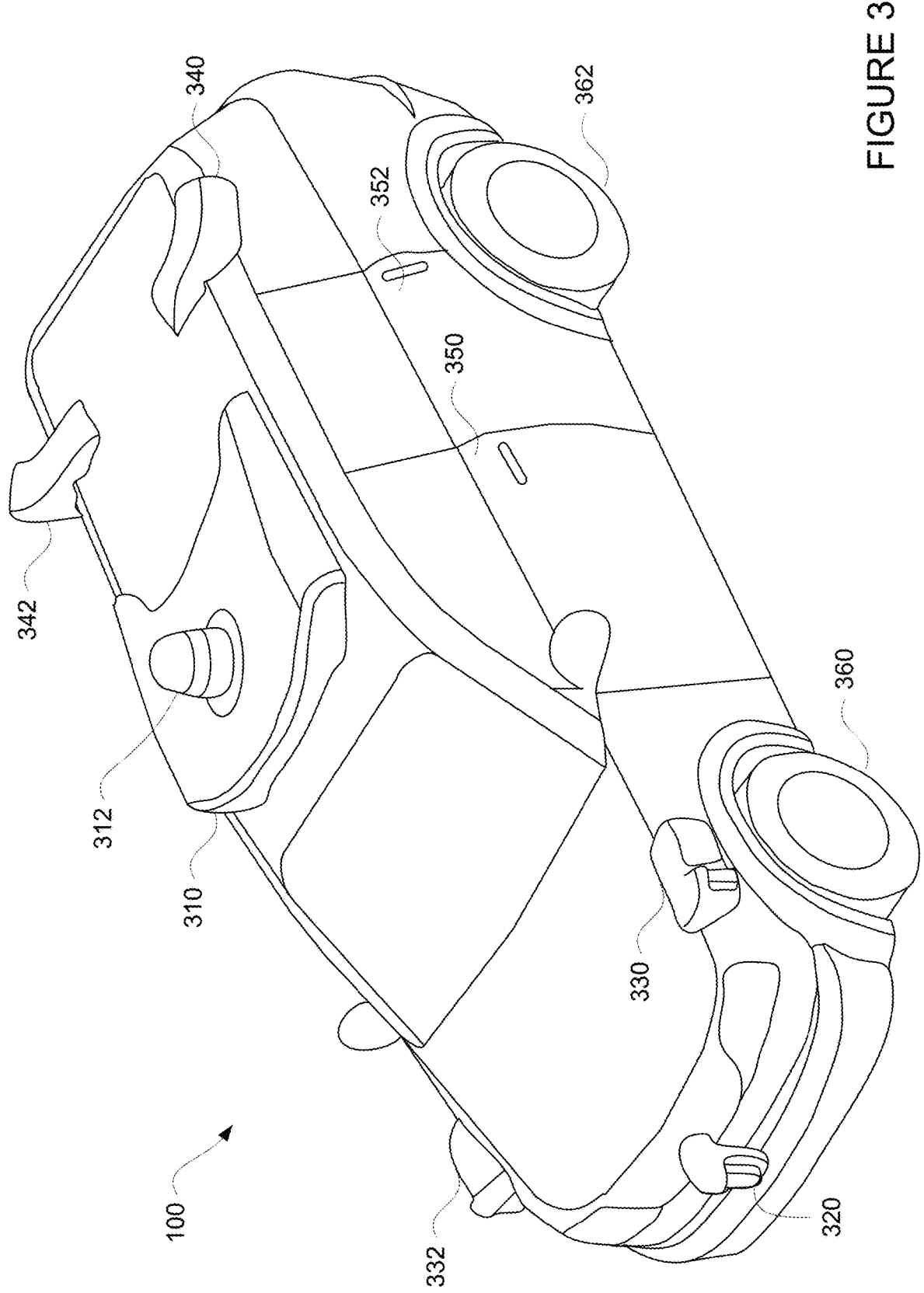
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing devices 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have riders that emit heat from their bodies), etc. In addition, the object may be classified based on specific attributes of the object, such as information contained on a license plate, bumper sticker, or logos that appear on the vehicle.

In one example, computing devices 110 may be operable to predict another vehicle's future movement based solely on the other vehicle's instant direction, acceleration/deceleration and velocity, e.g., that the other vehicle's current direction and movement will continue. However, memory 130 may also store behavior models that provides the probability of one or more actions being taken a detected object. To increase the usefulness of these behavior models, each behavior model may be associated with a specific type of object. For instance, one type of behavior model may be used for objects identified as pedestrians, another type of behavior model may be used for objects identified as vehicles, another type of behavior may be used for objects identified as bicycles or bicyclists, etc. The behavior models may be used by the computing devices 110 in order to predict a detected object's future movement by analyzing data relating to the other vehicle's current surroundings and determining how that other object will likely respond to those surroundings. In this regard, the behavior models may function from an object-centric, view of the object's environment, in that the system determines what the other objects are perceiving in order to better predict how those objects will behave. In this regard, in at least some instances, the behavior models may also indicate whether the predicted behavior for an object is responsive to a particular other object including the vehicle 100.

Memory 130 may also store a set of predetermined maneuvering options which may be used, as discussed further below, to generate trajectories. A maneuvering option may be a predefined maneuvering behavior for the vehicle such that all maneuvering options are predefined. Examples of maneuvering behaviors may include, for instance, nudging left around an object, nudging right around an object, changing lanes by merging left, changing lanes by merging right, merging behind another vehicle, merging in front of another vehicle, making a right turn, making a left turn, and so on.

At least some of the maneuvering options may be associated with alternative maneuvering options. For instance, a maneuvering option that includes nudging right to move around another object may be considered an alternative to a maneuvering option that includes nudging left to move around an object. Similarly, going straight at an intersection may be considered an alternative to turning right, going straight at an intersection may be considered an alternative to turning left, lane changing may be considered an alternative to not lane changing, finishing a lane change may be considered an alternative to aborting a lane change, making a wide left turn may be considered an alternative to make a sharp left turn, and so on.

Some of the predetermined maneuvering options may be associated with predetermined driving situations. As an example, in more difficult predetermined driving situations, such as where the vehicle is required to merge into another lane or an exit ramp, may be associated with alternative maneuvering options such as both merging behind and ahead of adjacent road users such as vehicles or bicyclists. As another example, a predetermined driving situation that includes the vehicle in a double left hand turning lane with another vehicle in an adjacent left hand turning lane may be associated with a maneuvering options for going straight. As another example, a predetermined driving situation that includes the vehicle approaching a right turn on a route may be associated with a maneuvering option for making a left turn and/or going straight. Similarly, a predetermined driving situation that includes the vehicle approaching a u-turn on a route may be associated with maneuvering options making a left turn, right turn, and/or going straight.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
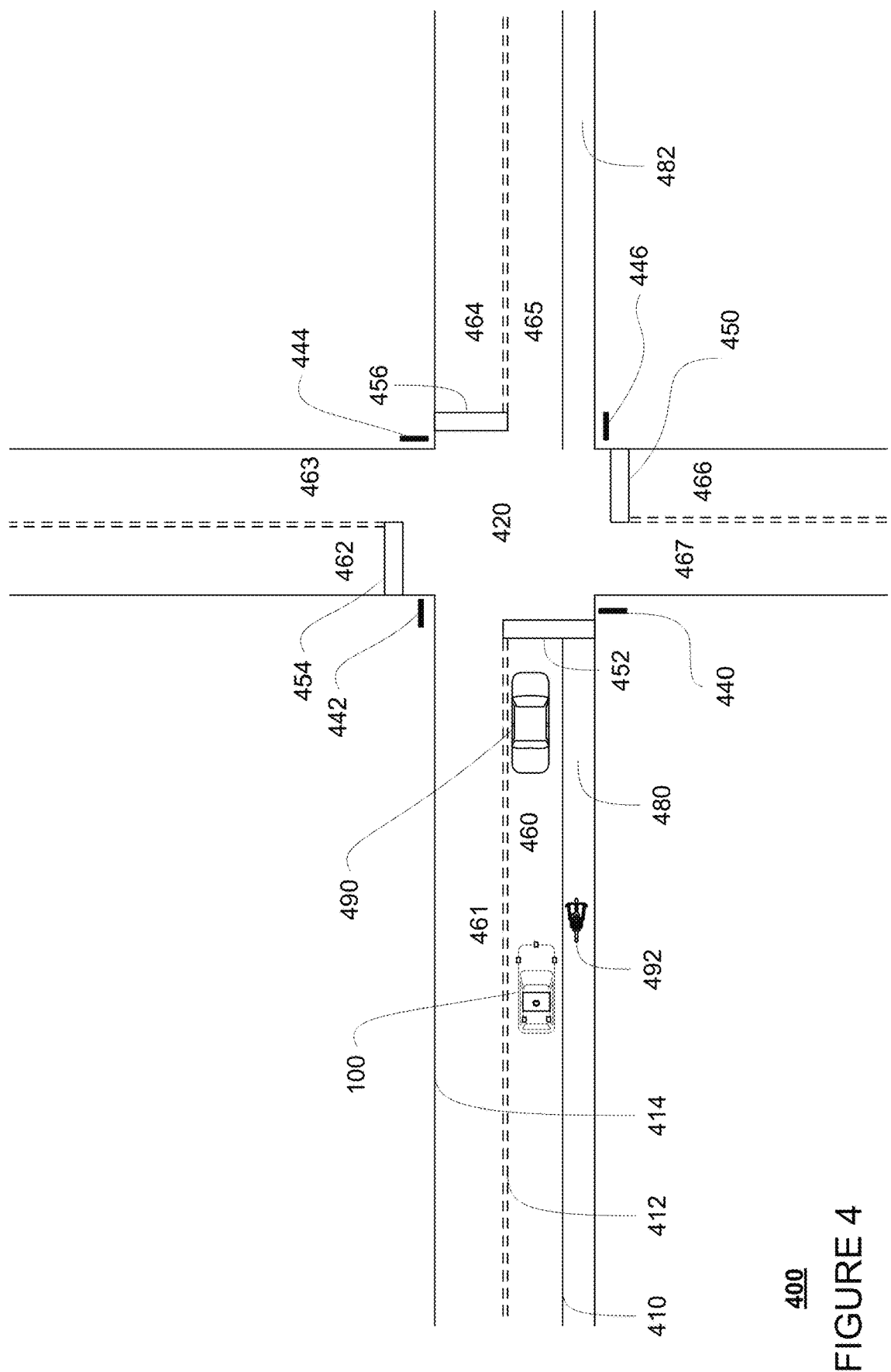
FIG. 4 is a view of a section of roadway in accordance with aspects of the disclosure.
Figure 5:
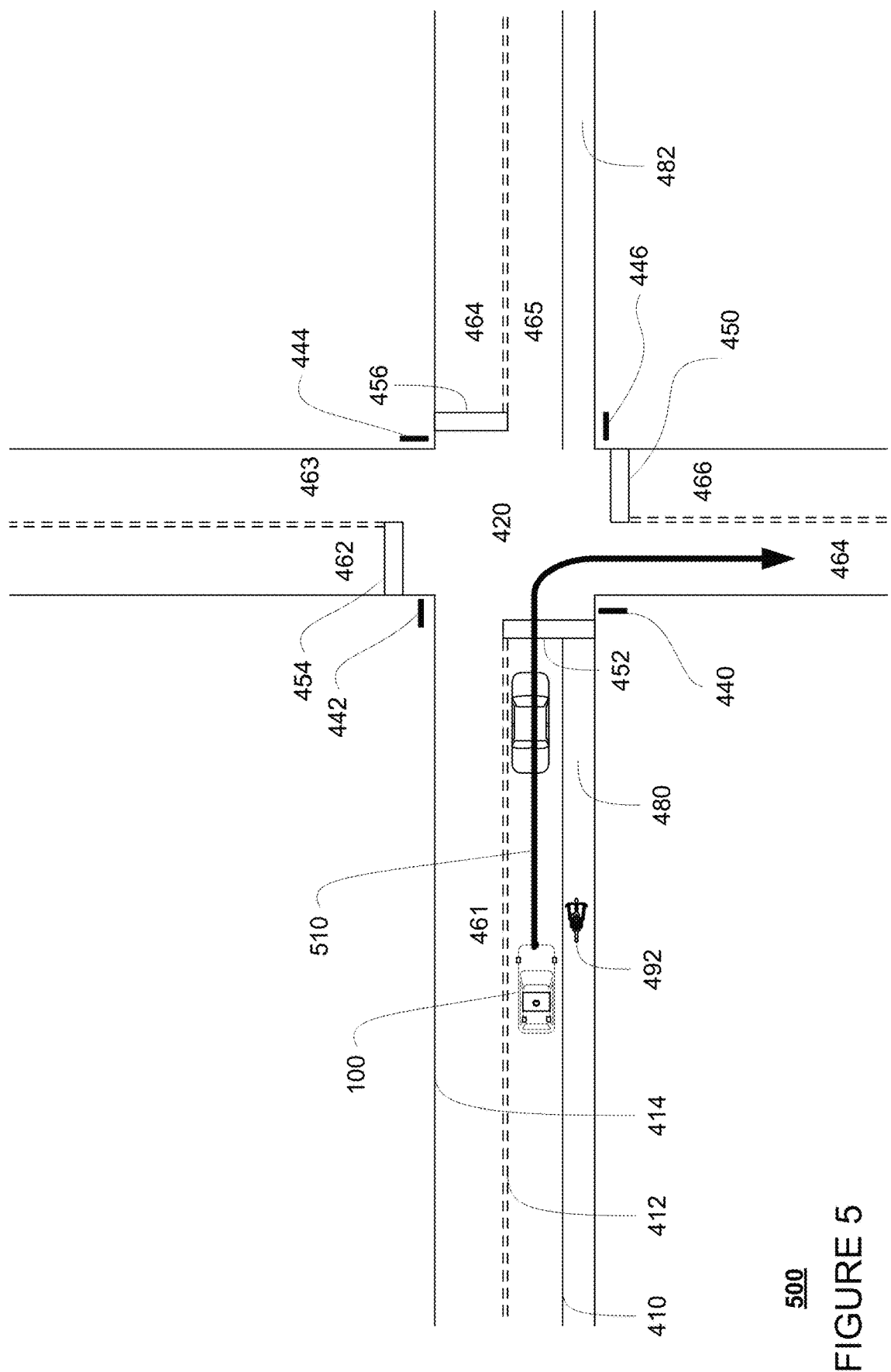
FIG. 5 is a view of a section of roadway and data in accordance with aspects of the disclosure.

FIG. 4 is an example 400 bird's eye view of a section of roadway corresponding to map information 200. In this example, the shape location and other characteristics of intersection 420, lane lines 410, 412, 414, stop signs 440, 442, 444, 446, stop lines 450, 452, 454, 456, lanes 460-467, and bicycle lanes 480, 482, may generally correspond to the shape location and other characteristics of intersection 220, lane lines 210, 212, 214, stop signs 240, 242, 244, 246, stop lines 250, 252, 254, 256, lanes 260-267, and bicycle lanes 280, 282, respectively. In this example, vehicle 100 is driving in lane 460 towards intersection 420. In addition, another vehicle 490 is also driving in lane 460 towards intersection 420, and a bicyclist 492 is riding in a bicycle lane 480 towards intersection 420 as well. Turning to example 500 of FIG. 5, vehicle 100 is currently following a route which includes the vehicle making a right turn at intersection 420 into lane 464. In this regard, vehicle 100 is currently following trajectory 510.

As noted above, the computing devices 110 may use the routing system to determine a route to a destination. The computing devices 110 may then periodically generate trajectories, for instance ever 0.1 times per second or more or less, for the vehicle to follow for some time and distance into the future in order to follow the route to the destination. As noted above, these trajectories are generated as "desired paths" in order to avoid obstacles, obey laws and generally drive safely and effectively. Each trajectory may define various requirements for the vehicle's acceleration, speed, and position at different times along the trajectory. In this regard, the trajectory may include both geometry and speed/acceleration components. The computing devices 110 may operate to manage steering, powertrain and braking in order to cause the vehicle to follow the trajectory. The computing devices 110 may receive feedback from the vehicles sensors including sensors of and/or the perception system 172 and the positioning system 170. This feedback may include information such as the current acceleration, speed, and position of the vehicle as well as those characteristics of objects detected in the vehicle's environment.

Figure 12:
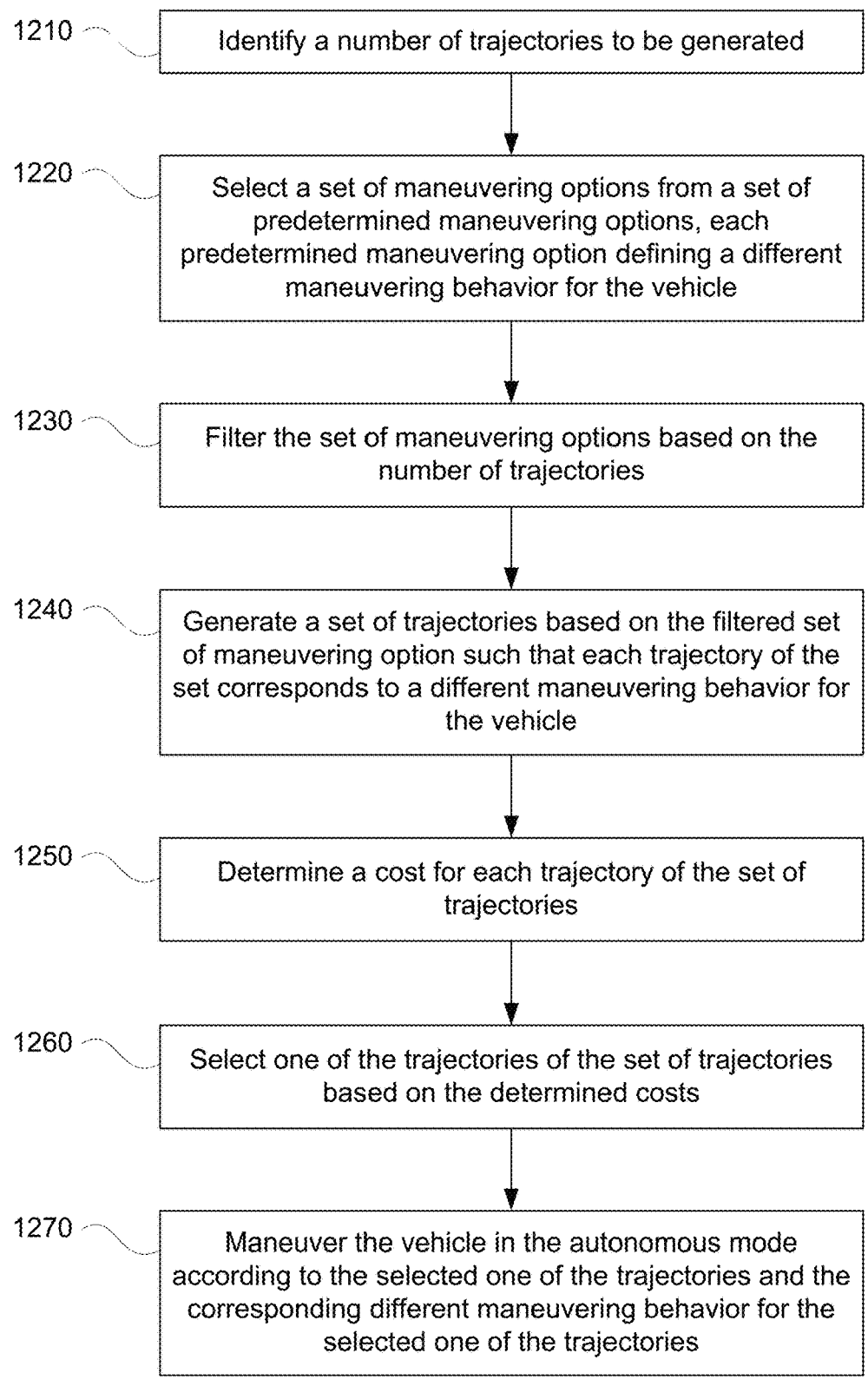
FIG. 12 is flow diagram in accordance with aspects of the disclosure.

FIG. 12 is an example flow diagram 1200 that may be performed by one or more processors such as one or more processors 120 of computing device 110 in order to perform a method of generating trajectories for a vehicle driving in an autonomous driving mode. In this example, at block 1210, a number of trajectories may be identified. In other words, in order to generate trajectories for the vehicle to follow, the computing devices 110 may first identify or determine a number of trajectories to be generated. This may be based on a default or fixed number of trajectories, such as 7 or more or less.

Once the number of trajectories is determined, the computing devices 110 may then select a set of maneuvering options. For instance, at block 1220, a set of maneuvering options is selected from a set of predetermined maneuvering options. The set of maneuvering options may be selected from the predetermined maneuvering options in various ways. For instance, maneuvering options may be selected based on a type of maneuvering option selected for a prior iteration (or rather for the trajectory which the vehicle is currently following), specific alternatives to that type of trajectory as discussed above, as well as contextual information.

Figure 6:
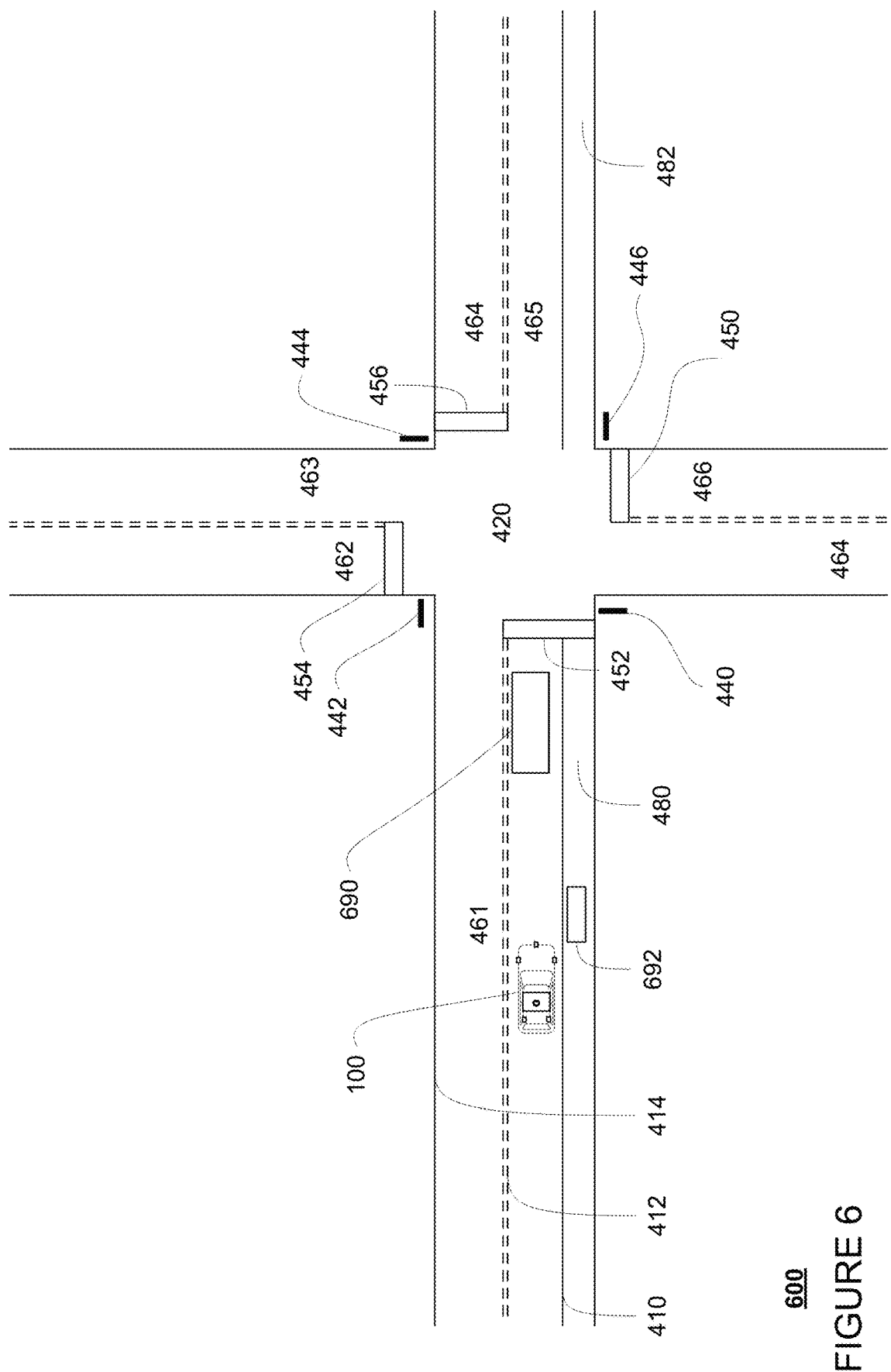
FIG. 6 is another view of a section of roadway and data in accordance with aspects of the disclosure.

This contextual information may include, for instance, information from the vehicle's map information, perceived objects and their relative locations and predicted behaviors. For instance, as the vehicle drives around, the perception system 172 and/or computing devices 110 may detect and identify objects and their characteristics. For instance, as shown in example 600 of FIG. 6, the perception system 172 may detect various objects in the vehicle's environment. In addition to the features of the map information 200, the perception system 172 may also detect and identify objects such as objects represented by bounding boxes 690 and 692. In this example, the bounding boxes represent an estimated size, shape, orientation and location of the detected objects and may "bound" the data points, such as LIDAR sensor data points or camera image data points, relative to the example 500. As noted above, the predicted behaviors may be determined using behavior models for each type of detected object.

The maneuvering options may be selected based on the type of behavior that the vehicle is currently attempting to accomplish. For instance, returning to FIG. 5, vehicle 100 is currently following trajectory 510 in order to make a right turn at intersection 220. As such, turning right may be included as a maneuvering option in the set of maneuvering options.

In addition, the maneuvering options may be selected based on a specific situation in which the vehicle is presently when that specific situation corresponds to a predetermined driving situation. In this regard, the contextual information may be compared to the predetermined driving situations in order to determine which if any of the predetermined driving situations the vehicle is currently. The associated maneuvering option or options may then be included in the set of maneuvering options.

Figure 7:
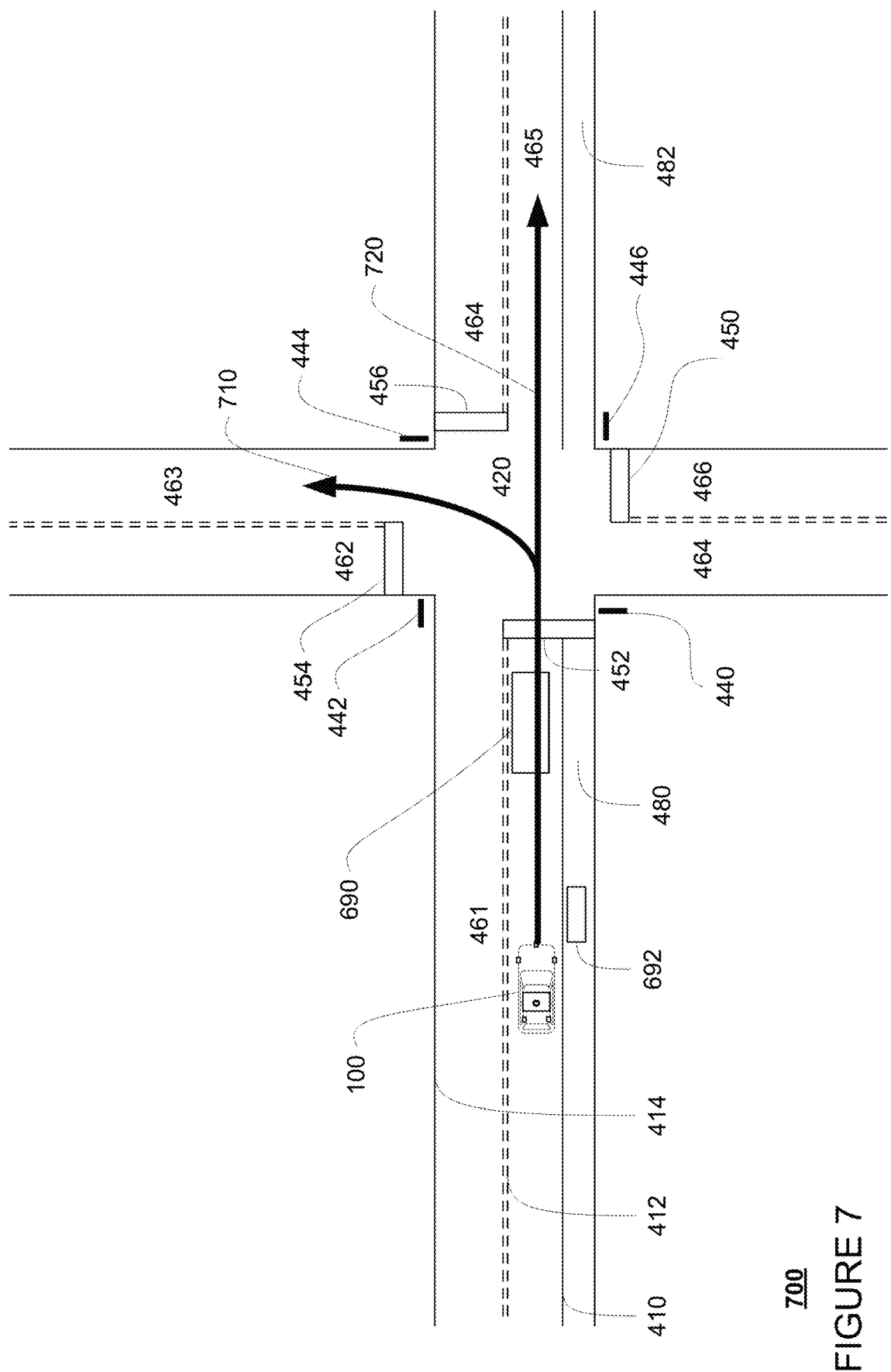
FIG. 7 is another view of a section of roadway and data in accordance with aspects of the disclosure.

As one example, if the vehicle is required to merge into another lane or an exit ramp which corresponds to a predetermined driving situation, both merging behind and ahead of adjacent road users such as vehicles or bicyclists, may be included in the maneuvering options. As another example, if the vehicle is in a double left hand turning lane with another vehicle in an adjacent left hand turning lane which corresponds to a predetermined driving situation, a maneuvering options for going straight may be included in the set of maneuvering options. As another example, returning to FIG. 5, where vehicle 100 is approaching a right turn on route which corresponds to a predetermined driving situation, the set of maneuvering options may include making a left turn and/or going straight at intersection 420 as indicated by path lines 710 and 720, respectively of example 700 of FIG. 7. As another example, if the vehicle approaching a u-turn on a route which corresponds to a predetermined driving situation, the set of maneuvering options may also include making a left turn, right turn, and/or going straight.

In some instances, the set of maneuvering options may include a number of maneuvering options that is greater than the number of trajectories to be generated. As such, the set of maneuvering options may be filtered to reduce the number of maneuvering options in the set of maneuvering options to equal the number of trajectories to be generated. As shown in block 1230 of FIG. 12, the set of maneuvering options is filtered based on the number of trajectories. In other words, post filtering, the number of maneuvering options in the set should be equal to the number of trajectories.

In order to do so, the set of maneuvering options may be filtered to remove maneuvering options based on priority levels. For instance, for each maneuvering option of the set, the computing devices 110 may determine a priority level. This determination may be based on the type of maneuvering option and what it is being used for. For instance, if a first maneuvering option is selected specifically to avoid a collision and a second maneuvering option is selected to follow a current route, the first maneuvering option may have a higher priority level than the second maneuvering option. As another example, if a third maneuvering option is selected in order to move around a nearby object and a fourth maneuvering option is selected in order to respond to an object that is farther away than the nearby object, the third maneuvering object may have a higher priority level than the fourth maneuvering option. In other words, priority levels may be related to a distance metric such that maneuvering options relating to nearby objects, nearby turns, nearby lane changing decisions, etc. are prioritized over those that are farther away.

Figure 8B:
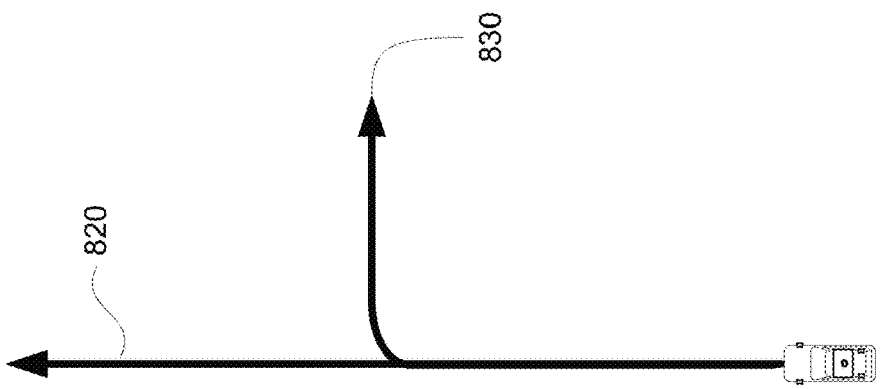
FIG. 8B is an example of a filtered set of maneuvering options in accordance with aspects of the disclosure.
Figure 8A:
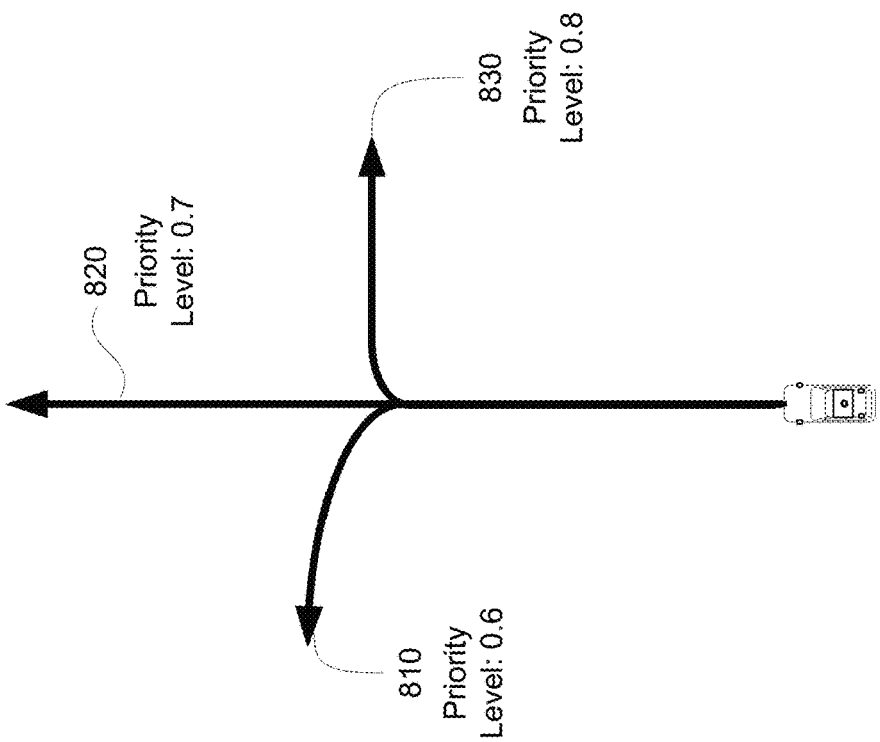
FIG. 8A is an example of a set of maneuvering options in accordance with aspects of the disclosure.

For instance, FIG. 8A represents a set of maneuvering options 810, 820, 830. As shown, each maneuvering option is annotated a priority level on a scale from 0 to 1, where 0 is lowest. In this example, the number of trajectories may be identified as 2. As the set of maneuvering options includes 3 maneuvering options, the lowest priority level maneuvering options, such as maneuvering options 810, may be filtered or removed, resulting in the filtered set of maneuvering options as shown in in FIG. 8B. Of course, when the number of maneuvering options in the set of maneuvering options is less than the number of trajectories, than no filtering is needed.

Thereafter, a corresponding trajectory may be generated for each maneuvering option of the filtered (or not filtered) set of maneuvering options. For instance, as shown in block 1240 of FIG. 12, a set of trajectories is generated based on the filtered set of maneuvering option such that each trajectory of the set corresponds to a different maneuvering behavior for the vehicle. In this regard, only a single trajectory need be generated for each maneuvering option of the filtered (or unfiltered) set of maneuvering options. Each trajectory may be determined as a single problem (solving for geometry and speed at once) or a two-part problem (solving for geometry and thereafter speed). These trajectories may be computed in parallel, which again emphasizes the need to limit the number of different maneuvering options in a given set of maneuvering options.

Figure 9:
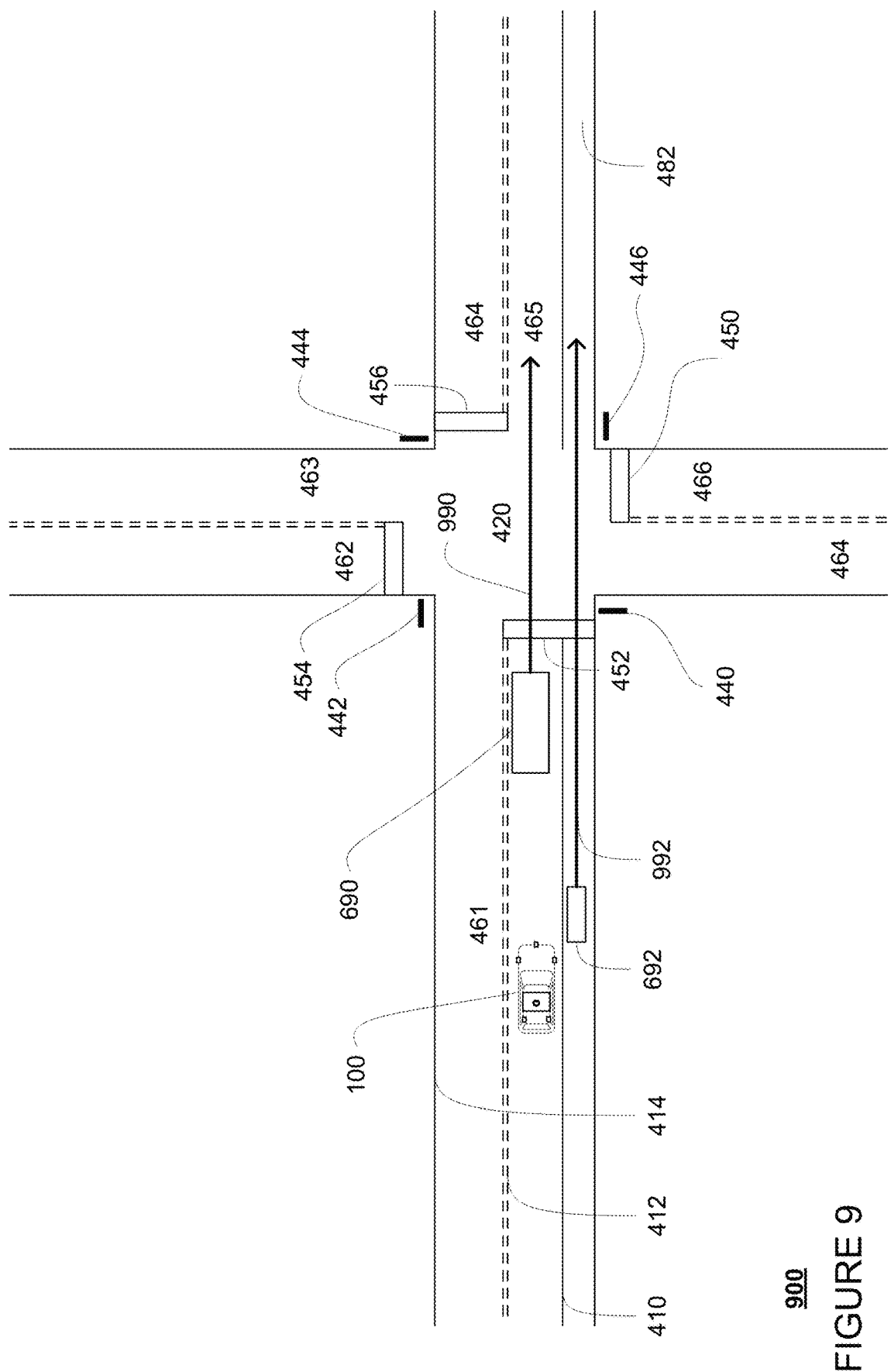
FIG. 9 is another view of a section of roadway and data in accordance with aspects of the disclosure.

The trajectories may be generated, for instance, based on a set of constraints. As the vehicle drives around, the vehicle's perception system may detect and identify objects and their characteristics. As such, the objects and their characteristics, such as location, speed, heading, orientation, projected behaviors, etc. may be used to generate a set of constraints identifying locations at certain times at which the vehicle cannot be. In this regard, the objects and their characteristics, such as location, speed, heading, orientation, projected behaviors, etc. may be used to generate a set of constraints identifying locations at certain times at which the vehicle should not be in order to avoid collision. As an example, the constraints may include avoiding or not coming within some predetermined distances of locations on predicted behaviors or trajectories of detected objects. For instance, turning to example 900 of FIG. 9, path lines 990 and 992 represent predicted trajectories for each of bounding boxes 690, and 692, respectively which may be predicted based on the estimated characteristics of these objects as discussed above and used to determine the set of constraints.

For each given maneuvering option of the set of maneuvering options computing devices may then generate a trajectory that allows the vehicle to satisfy as many constraints as the set of constraints as in order to follow the given maneuvering option. In addition, to ensure that the given maneuvering option is followed, one or more constraints may be used to implement that maneuver. For instance, if the given maneuvering option is to nudge the vehicle to the left, the set of constraints may include a constraint that forces the trajectory to move to the left. For example, as shown in example 1000 of FIG. 10, computing devices 110 may generate a set of trajectories, one for each of the maneuvering options of the filtered set of maneuvering options of FIG. 8B which satisfy as many constraints of the set of constraints as possible.

Figure 10:
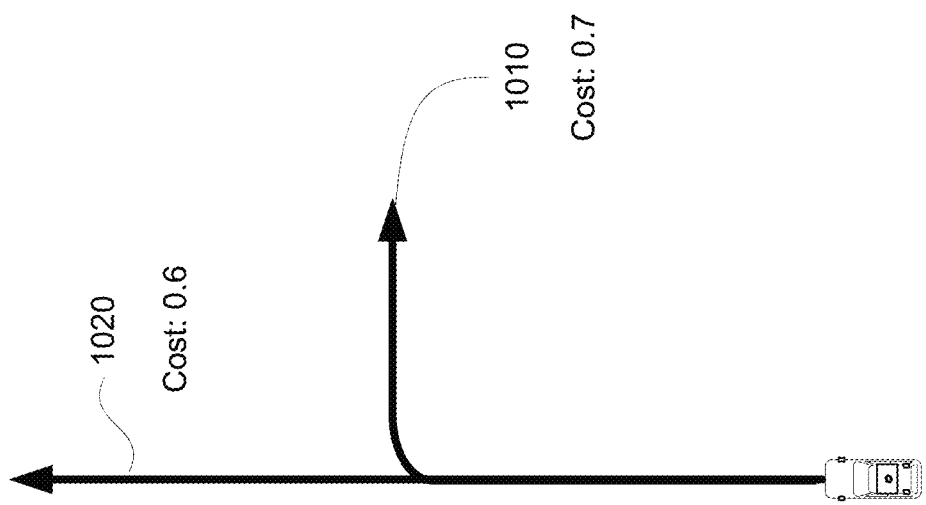
FIG. 10 is an example of a set of trajectories and costs in accordance with aspects of the disclosure.

The computing devices 110 may then determine a cost for each trajectory. For instance, as shown in block 1250 of FIG. 12, a cost for each trajectory of the set of trajectories is determined. In addition, the trajectories 1010, 1020 of FIG. 10 are annotated with a corresponding cost, here on a scale from 0 to 1, where 0 indicates a low cost and 1 indicates a high cost. This cost may be for instance, a weighted sum of different factors. Such factors may include, for instance, how far off of the route the vehicle would go, how much progress the vehicle would make along its trajectory or route, whether the vehicle would block traffic, whether the vehicle would brake hard, level of discomfort to a passenger of the vehicle, level of discomfort to other vehicles, whether the vehicle would collide or nearly collide with another vehicle or object, if the trajectory involve changing lanes the speed of the vehicle, whether the vehicle is required to perform a particular evasive maneuver, whether the vehicle would have to go "off road", whether the vehicle would go into an oncoming traffic lane, whether the vehicle would be required to leave its current lane, and so on.

The computing devices 110 may then select a trajectory of the set of trajectories. For instance, as shown in block 1260 of FIG. 12, one of the trajectories of the set of trajectories is selected based on the determined costs. As an example, the trajectory having the lowest cost, such as trajectory 1020 of FIG. 10, may be selected. As an example, given the constraints associated with bicyclist 492 who is predicted to proceed straight through intersection 420, this may result in a higher cost for the vehicle to make a right turn following trajectory 1010 than to proceed straight at intersection 420 following trajectory 1020.

Figure 11:
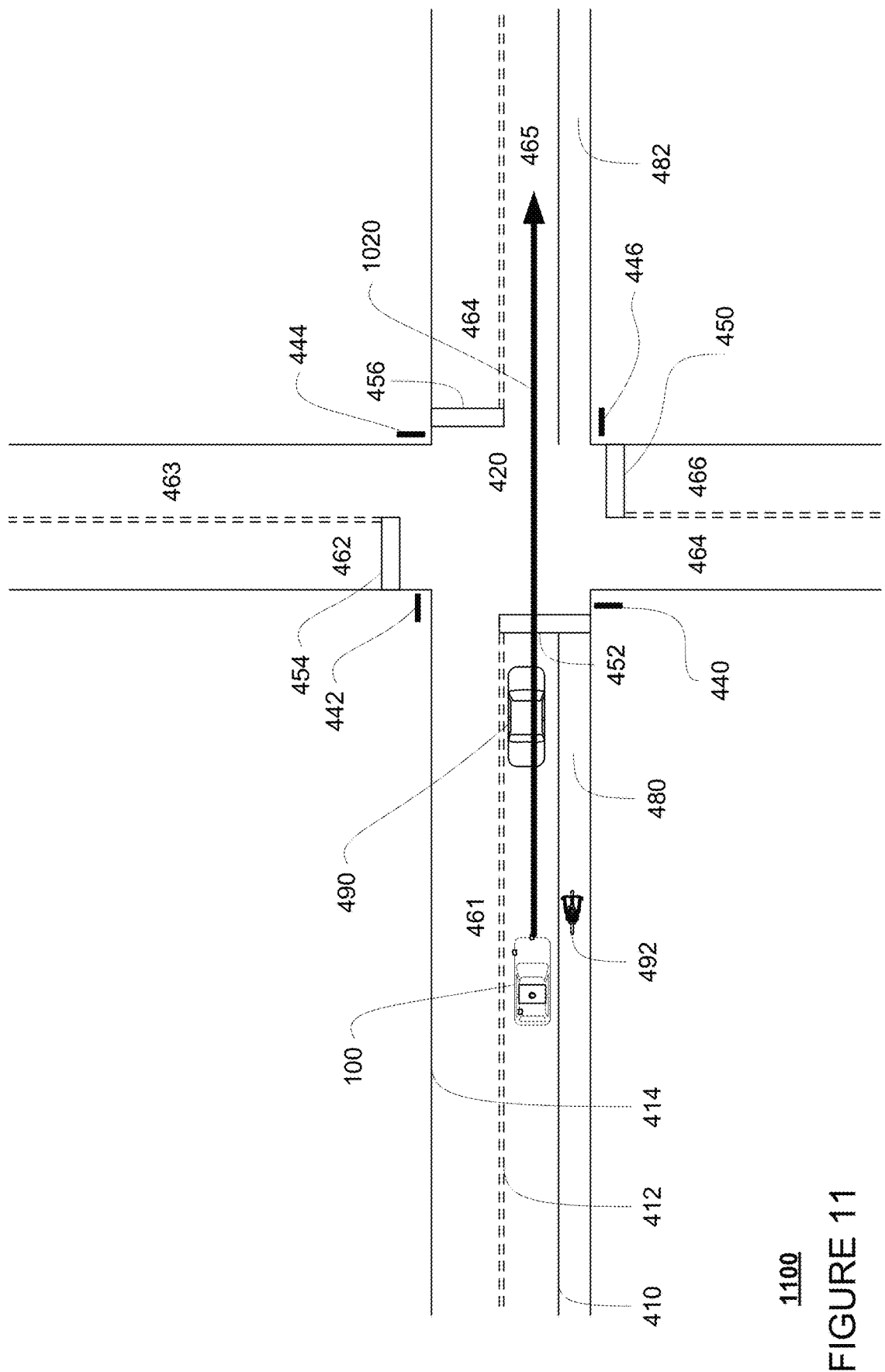
FIG. 11 is another view of a section of roadway and data in accordance with aspects of the disclosure.

This trajectory may then be used to control the vehicle. For instance, as shown in block 1270 of FIG. 12, the vehicle is maneuvered in the autonomous driving mode according to the selected one of the trajectories and the corresponding different maneuvering behavior for the selected one of the trajectories. For instance, as shown in example 1100 of FIG. 11, vehicle 100 is now being controlled by computing devices 110 in order to following trajectory 1020. As such, the computing devices 110 have effectively cancelled the right turn at intersection 420 in favor of going straight given the lower cost of trajectory 1020 as compared to trajectory 1010. Of course, the generation and selection of trajectories may be contingent on the circumstances in which the vehicle is currently. The computing devices 110 may continue to cause the vehicle to follow trajectory 1020 until a new trajectory is selected in a next iteration. In that regard, the process would return to determining a number of trajectories, determining a set of maneuvering options, generating trajectories, determining the costs for the trajectories, and selecting a lowest cost trajectory.

Over time, this process allows the computing devices 110 to react to changing situations by changing its behavior, and not simply by "hitting the brakes". For instance, if another vehicle begins to cut into the vehicle's lane, the vehicle can respond by doing a lane change, even though the vehicle had previously not been planning to do a lane change. If another object is approaching from behind the vehicle on the right, but the vehicle is about to make a lane change, the vehicle can respond by effectively cancelling the right turn, going straight or changing lanes if needed. This process also allows the vehicle to respond to reckless behaviors of other vehicles immediately. In addition, if the vehicle is positioned behind another slow-moving vehicle, this process allows the computing devices 110 to determine the best time to pass that vehicle as well as whether that passing should be on the left or the right.

Again, the features described herein may allow the vehicle's computing devices to generate trajectories in an efficient and useful way. For instance, rather than simply generating a random number of trajectories in a predetermined period of time, a fixed number of trajectories with specific maneuvering behaviors selected based on current circumstances may be generated. This increases efficiency and usefulness of the trajectory generation, and in effect, the vehicle is able to cancel maneuvers and execute different maneuvers which may result in an increase in the adaptiveness of the vehicle. In other words, the vehicle is able to give up on its current behavior and choose to go somewhere else in order to avoid a collision or other unwanted circumstance. This, in turn, may improve the quality of the ride and the safety of the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of maneuvering a vehicle operating in an autonomous driving mode, the method comprising:
   selecting, by one or more processors, a subset of maneuvering options from a plurality of predetermined maneuvering options stored in a memory based on a criteria, each one of the plurality of predetermined maneuvering options defining a respective maneuvering behavior for the vehicle;
   generating, by the one or more processors, a set of trajectories based on the subset of maneuvering options such that each trajectory in the set of trajectories corresponds to the respective maneuvering behavior for the vehicle, wherein a number of maneuvering options in the subset of maneuvering options is equal to a number of trajectories in the set of trajectories;
   selecting, by the one or more processors, a trajectory from the set of trajectories; and
   maneuvering, by the one or more processors, the vehicle in the autonomous driving mode according to the selected trajectory.

2. The method of claim 1, wherein the number of the trajectories is a default number or a fixed number.

3. The method of claim 2, wherein the fixed number of the trajectories are associated with specific maneuvering behaviors selected based on current circumstances.

4. The method of claim 1, further comprising:
   filtering, by the one or more processors, the maneuvering options in the subset of maneuvering options based on the number of the trajectories in the set of trajectories.

5. The method of claim 4, further comprising:
   determining, by the one or more processors, a priority level for each of the maneuvering options in the subset of maneuvering options, wherein the filtering includes removing one or more maneuvering options from the subset of maneuvering options based on the priority levels when the number of maneuvering options in the subset of maneuvering options is greater than the number of the trajectories.

6. The method of claim 5, wherein the priority levels are related to a distance metric such that maneuvering options relating to nearby objects, nearby turns or nearby lane changing decisions are prioritized over those objects that are farther away.

7. The method of claim 1, wherein a first maneuvering option in the subset of maneuvering options is selected specifically to avoid a collision.

8. The method of claim 7, wherein a second maneuvering option in the subset of maneuvering options is selected to follow a current route.

9. The method of claim 8, wherein the first maneuvering option has a higher priority than the second maneuvering option.

10. A vehicle operating in an autonomous driving mode, the vehicle comprising:
    a memory configured to store a plurality of predetermined maneuvering options, each one of the plurality of predetermined maneuvering options defining a respective maneuvering behavior for the vehicle; and
    one or more processors coupled with the memory, the one or more processors being configured to:
    select a subset of maneuvering options from the plurality of predetermined maneuvering options stored in the memory based on a criteria;
    generate a set of trajectories based on the subset of maneuvering options such that each trajectory in the set of trajectories corresponds to the respective maneuvering behavior for the vehicle, wherein a number of maneuvering options in the subset of maneuvering options is equal to a number of trajectories in the set of trajectories;
    select a trajectory from the set of trajectories; and
    maneuver, the vehicle in the autonomous driving mode according to the selected trajectory.

11. The method of claim 1, wherein the criteria include a type of maneuvering option selected for a prior iteration or a trajectory the vehicle is currently following.

12. The method of claim 1, wherein the criteria include a type of behavior that the vehicle is currently attempting to accomplish.

13. The method of claim 1, wherein the criteria include a specific situation in which the vehicle is presently when that specific situation corresponds to a predetermined driving situation.

14. The vehicle of claim 10, wherein the number of the trajectories is a default number or a fixed number.

15. The vehicle of claim 14, wherein the fixed number of trajectories are associated with specific maneuvering behaviors selected based on current circumstances.

16. The vehicle of claim 10, wherein the maneuvering options in the subset of maneuvering options are filtered based on the number of the trajectories in the set of trajectories.

17. The vehicle of claim 16, wherein a priority level for each of the maneuvering options in the subset of maneuvering options is determined, whereby one or more maneuvering options are removed from the subset of maneuvering options based on priority levels when the number of the maneuvering options in the subset of maneuvering options is greater than the number of the trajectories.

18. The vehicle of claim 17, wherein the priority levels are related to a distance metric such that maneuvering options relating to nearby objects, nearby turns or nearby lane changing decisions are prioritized over those objects that are farther away.

19. The vehicle of claim 10, wherein a first maneuvering option in the subset of maneuvering options is selected specifically to avoid a collision.

20. The vehicle of claim 19, wherein a second maneuvering option in the subset of maneuvering options is selected to follow a current route.

21. The vehicle of claim 20, wherein the first maneuvering option has a higher priority than the second maneuvering option.

* * * * *